US010503836B2

(12) United States Patent
Latvala et al.

(10) Patent No.: US 10,503,836 B2
(45) Date of Patent: Dec. 10, 2019

(54) METHOD FOR GENERATING NATURAL LANGUAGE COMMUNICATION

(71) Applicant: EQUIVALENTOR OY, Tuusula (FI)

(72) Inventors: Joni Latvala, Espoo (FI); Saku Valkama, Tuusula (FI)

(73) Assignee: EQUIVALENTOR OY, Tuusula (FI)

( * ) Notice: Subject to any disclaimer, the term of this patent is extended or adjusted under 35 U.S.C. 154(b) by 74 days.

(21) Appl. No.: 15/565,460

(22) PCT Filed: Apr. 13, 2016

(86) PCT No.: PCT/FI2016/050244
§ 371 (c)(1),
(2) Date: Oct. 10, 2017

(87) PCT Pub. No.: WO2016/166417
PCT Pub. Date: Oct. 20, 2016

(65) Prior Publication Data
US 2018/0129651 A1 May 10, 2018

(30) Foreign Application Priority Data
Apr. 13, 2015 (FI) .................................. 20155267

(51) Int. Cl.
G06F 17/27 (2006.01)
G06F 17/28 (2006.01)
(Continued)

(52) U.S. Cl.
CPC ...... G06F 17/2881 (2013.01); G06F 17/2705 (2013.01); G06F 17/2785 (2013.01); G06N 20/00 (2019.01); G06F 3/0486 (2013.01)

(58) Field of Classification Search
CPC ........................................... G06F 17/02
(Continued)

(56) References Cited

U.S. PATENT DOCUMENTS 5,710,900 A 1/1998 Anand et al.
6,289,301 B1 9/2001 Higginbotham et al.
(Continued)

FOREIGN PATENT DOCUMENTS

WO WO 2011/004394 A1 1/2011
WO WO 2014/009873 A2 1/2014
WO WO 2014/068567 A1 5/2014

OTHER PUBLICATIONS

International Search Report & Written Opinion dated Sep. 9, 2016 corresponding to International Patent Application No. PCT/FI2016/050244.
(Continued)

Primary Examiner — Jesse S Pullias
(74) Attorney, Agent, or Firm — Squire Patton Boggs (US) LLP

(57) ABSTRACT

A method and a computer program product are implementable on a computing device are configured for generating natural language communication. A user interface displays a first number of recipient-specific pseudo-predefined elements. A semantic allocation of the elements is received from a user, wherein at least part of the first number of recipient-specific pseudo-predefined elements are allocated into at least two different classes. The semantically allocated elements are allocated into at least one logical class which defines, for each semantically allocated element, a specific portion or context of the communication to be automatically generated. A natural language sentence is generated in each logical class containing at least one of the semantically allocated elements. The generated sentence includes elements allocated to the respective logical class in said at least one generated sentence, or the sentence may include words describing a semantic meaning of the elements allocated to the logical class.

17 Claims, 8 Drawing Sheets

(51) Int. Cl.
    *G06N 20/00*    (2019.01)
    *G06F 3/0486*    (2013.01)
(58) Field of Classification Search
    USPC .......................... 704/1, 9, 10, 257, 270–275
    See application file for complete search history.

(56) References Cited

U.S. PATENT DOCUMENTS

| | | |
|---|---|---|
| 6,957,186 B1 | 10/2005 | Guheen et al. |
| 8,775,287 B1 | 7/2014 | Igoe et al. |
| 2006/0020886 A1* | 1/2006 | Agrawal ............... G06F 17/243 715/256 |
| 2007/0213975 A1 | 9/2007 | Shimoda et al. |
| 2009/0089154 A1 | 4/2009 | Dion |
| 2009/0299993 A1 | 12/2009 | Novack |
| 2009/0327168 A1 | 12/2009 | Weinberger et al. |
| 2011/0218822 A1 | 9/2011 | Buisman et al. |
| 2012/0084120 A1 | 4/2012 | Hirsch et al. |
| 2012/0185358 A1* | 7/2012 | Ajjarapu ............... G06Q 30/06 705/26.62 |
| 2013/0262131 A1 | 10/2013 | Lewis |
| 2014/0143720 A1 | 5/2014 | Dimarco et al. |
| 2015/0081696 A1 | 3/2015 | Ogawa |
| 2015/0161106 A1* | 6/2015 | Barbetta ............. G06F 16/3326 434/362 |

OTHER PUBLICATIONS

Finnish Search Report dated Dec. 1, 2015 corresponding to Finnish Patent Application No. 20155267.
International Preliminary Report on Patentability dated Aug. 17, 2017 corresponding to International Patent Application No. PCT/FI2016/050244.

\* cited by examiner

METHOD FOR GENERATING NATURAL LANGUAGE COMMUNICATION

FIELD OF THE INVENTION

The present invention relates to natural language processing and especially to a method implementable on a computing device for generating natural language communication. The invention further relates to a computer program product and a non-transitory computer-readable memory that contains computer readable instructions implementing the method. The present invention further relates to a computer program product providing a user interface and more particularly to a computer program product providing a user interface for a natural language processing system for generating natural language communication.

BACKGROUND

Natural language processing (NLP) is a field of computer science, artificial intelligence and linguistics, which aims in human-computer interaction using natural language. Natural language generation (NLG) focuses on generation of natural language from a machine representation.

Automation provides us with greatly increased efficiency, and in today's world every task is subject to automation. Automatically created communication may meet the formal requirements set for the communication, but lack of personalization is easily recognizable by a recipient, thus revealing the automatic nature of the message, reducing its emotional effect. A common pitfall in computer generated communication is use of a limited number of fixed templates, which lead to text which is easily recognizable by a human as being computer generated even if populated with data selected specifically for a particular recipient. While the unintended by-product of the automatizing is the lack of 'human touch', this may lead e.g. to lost sales, customers or employees because people also make decisions based on emotions and empathy. Receiving communication that has the touch and feel of being fully automatically generated has seldom ability to create positive emotions and empathy.

U.S. Pat. No. 5,710,900 presents a solution for generating reports based on business information.

U.S. Pat. No. 6,289,301 presents a method for providing augmentative communication where lexical items in pre-defined slots are replaced with substitution lexical items in order to create natural language sentences.

US patent application US2014/0143720 presents a system where NLP algorithms are utilized for generating item recommendations based on categorization of preferences of items.

However, no method is presented in these documents for generating personalization of the natural language or for ensuring a naturally variable result even for consecutive communication occasions with the same recipient.

A method is needed to improve personalization of communication created using natural language processing.

SUMMARY

This invention utilizes natural language processing (NLP) for generating personal, human communication using natural language. Generated communication may comprise a document such as a letter or a message or for example automatically generated lines for a discussion between a recipient and a computer.

The method and system comprises semantic allocation of at least some elements characterizing the recipient into classes by a user different from the recipient. The method and the system further addresses the personalization challenge by building the 'human touch' factor by constructing computational profiles based on data analytics which may be performed both for the user and the recipient. As a result of initially at least partially human performed analytics, elements characterizing the recipient are used for generating personalized and variable natural language to be communicated towards the recipient(s) by an automatic communication generating tool. The system collects information and learns from categorization performed by the user, and eventually even the categorization or parts of it may be also performed automatically. Constructed computational profiles are used for adjusting the style and nuances of the generated communication (a document containing text, a message or a lines for textual discussion, for example) and the sentences in it to match with the personalities of the user and the recipient. Use of natural language processing together with the novel features significantly speeds up the creation of a natural language document if compared with manual generation of such document for example by writing or typing, but avoids pitfalls of fully machine generated communication which may cause misunderstandings and/or may diminish the influence of the communication especially when human emotional processing takes place. While the user semantically allocates a number of elements characterizing the recipient, the element-based communication generating tool allows combining the benefits of the actual human communication with speed and efficiency of a NLP system. Providing a simple and easy to use user interface allowing quick allocation of the elements, speed of communication generation is significantly increased if compared to any manual system, but avoiding pitfalls of automated communication leading to ineffective communication content. This variation is also enhanced by forming said natural language communication so that the generated sentences include semantic meaning of elements characterising the recipient, but not necessarily the elements as such. This improves variability of the resulting communication.

The present invention has the advantage that it provides a systematic way to efficiently increase intended influence of communication and decreasing risk of misunderstanding of the communication by the recipient of the NLP system generated communication. Generated communication is preferably in textual, printable form, but as known by a person skilled in the art, methods may be used to present a textual communication for a recipient for example as speech.

High variance is an important feature of natural language communication. The sentence processing algorithms of the communication system according to the present invention ensure that probability of having similar sentences across the generated document and across different generated documents is very low, which improves the impression of personality of the communication: a person sending several job applications to the same company or to several different companies using similar communication generation system essentially never receives two response letters that are exactly similar, and will probably not even think that the response he/she received was automatically generated.

The present invention has a further advantage that profiling of the user (sender of the message) and/or the recipient based on data analytics enables adjusting the nuances of the generated communication according to the calculated profiles of the persons involved in the communication.

The present invention allows multiple ways for semantically allocating the elements into classes. These classes into which the user allocates the elements may also be called as semantic classes. In a simple case, the allocation may comprise just two classes, such as weakness/strength related to the recipient, but the classification may also be made along at least one continuous axis, allowing the user to allocate elements along the entire length of the axis/axes so that the distance of the element from the origin indicates relative importance or strength of the characteristic corresponding to a specific element along the specific axis. Further, a ranking may be utilized for classification, where the elements are put in a specific order. Thus, the semantic allocation of the elements may further support dimensioning or weighing of the elements according to several aspects, which is further reflected to the semantics of the sentences. Although the communication generation disclosed is element-based, sentences may be generated based on semantics of the elements rather than only using the elements as such as part of the generated sentences.

The method and system according to the present invention may be configured for use in various communication purposes. In the following, we'll describe an example relating to recruiting, but the method and system may equally well be configured to be used for generating internal and external company communication and/or for training and education purposes.

The method and system according to the present invention may be used with any languages. Depending on the language, different sentence formation rules may be chosen to be used, suitable for the specific language and its characteristic structure. Logic rules and sentence forming algorithms used may be implemented using any known NLP algorithm, or an algorithm specifically built for this specific communication tool.

According to a first aspect, a method implementable on a computing device configured for generating natural language communication. The method comprises displaying in a user interface a first number of recipient-specific pseudo-predefined elements, receiving, through the user interface, a semantic allocation by a user of at least part of said first number of recipient-specific pseudo-predefined elements into at least two different classes, further allocating said semantically allocated elements into at least one logical class, said logical class defining for each semantically allocated element a specific portion of said communication to be generated and generating at least one natural language sentence in each logical class containing at least one of said semantically allocated elements, said at least one natural language sentence including at least one of said elements allocated to the respective logical class in said at least one generated sentence and a semantic meaning of said elements allocated to the respective logical class.

According to a second aspect, the method further comprises obtaining at least one analytics variable describing personality of the recipient and/or the user, and adjusting the style of the generated sentences based on the analytics variables.

According to a third aspect, the method further comprises obtaining a second number of recipient-specific data variables, allocating said data variables into at least one logical class, and generating at least one natural language sentence in each logical class containing at least one of said allocated data variables and/or at least one of said semantically allocated elements.

According to a fourth aspect, the method further comprises handling the logical classes in a preset order corresponding to a logical structure of the communication to be generated, selecting a semantically allocated element for sentence generation within the respective logical class in a priority order, and storing said selected element in a list of currently selected elements, wherein the highest priority element is selected first for storing.

According to a fifth aspect, the method further comprises selecting further semantically allocated elements to be included in sentence generation together with the element selected based on the priority order, if the further selected elements have a combining characteristic with the element selected based on the priority order, and storing said further selected elements in the list of currently selected elements.

According to a sixth aspect, the method further comprises forming at least one sentence including the selected elements in the list of currently selected elements or the semantic meaning of the selected elements in the currently selected elements by parsing said at least one sentence according to sentence formation rules, wherein said forming utilizes sentences and/or fragments of sentences stored in a sentence database, removing used elements from the list of currently selected elements, and appending the at least one formed sentence in a generated communication after earlier formed sentences.

According to a seventh aspect, the semantically allocated elements equals said first number of pseudo-predefined elements or the amount of semantically allocated elements is less than the first number of said pseudo-predefined elements, and the unallocated pseudo-predefined elements are not included in the generated sentences, or the number of semantically allocated elements contains at least one additional element that was not included in the first number of pseudo-predefined elements, wherein said user interface is configured to allow the user to add the at least one additional recipient-specific element into the recipient-specific pseudo-predefined elements, and semantic allocation for said at least one additional recipient-specific element to one of said at least two different classes is received during allocation of the recipient-specific pseudo-predefined elements.

According to an eighth aspect, the method further comprises providing, through the user interface, a final version of the generated communication for review after all semantically allocated elements and all logical classes have been processed, and all said semantically allocated elements have been included in the generated communication and allowing the user to modify, through the user interface, the final version of the generated communication prior to accepting the generated communication for sending.

According to a ninth aspect, the method further comprises sending the generated communication to a recipient and storing the generated communication in a permanent data repository together with log information and metadata related to the generated communication.

According to a tenth aspect, the method further comprises forming sentences based on a tree of predefined sentences and/or fractions of sentences using one or more probabilistic methods for selecting different branches of the tree of predefined sentences and fractions of sentences for the sentences to be generated, and completing the formed sentences by adding suitably formatted words representing the selected elements and/or data variables in the formed sentences.

According to an eleventh aspect, said probabilistic methods comprise computational scoring of sentences and/or fractions of sentences in order to facilitate selection among said sentences and/or fractions of sentences, and selecting the sentence or fraction of sentence that gets the highest score based on said computational scoring, or selecting randomly a sentence or a fraction of sentence whose computational score exceeds a set limit.

According to a twelfth aspect, said computational scoring gives score to a sentence of a fragment of sentence based on at least one of frequency of use of a word in the fraction in previous sentences, and frequency of use of a word the fraction in other fragments of the same sentence.

According to a thirteenth aspect, said sentences and/or fractions of sentences are selected based on at least one of the class into which the element was allocated a tag defining a grammatical family of the sentence and/or the fraction of sentence, a tag defining rate of formality of the sentence and/or the fraction of sentence, and a personality tag.

According to a further aspect, a computer program product is provided implementing the method.

According to another aspect, a computer program product comprising computer executable instructions configured to provide a user interface for a natural language processing system configured for generating natural language communication is provided. The computer program product being configured for displaying in the user interface a first number of recipient-specific pseudo-predefined elements, for receiving, from a user through the user interface, semantic allocation of a at least part of said recipient-specific pseudo-predefined elements into at least two different classes, for providing for the natural language processing system information about said allocation of the elements, and for receiving from the natural language processing system a final version of the automatically generated communication.

According to a further aspect, the computer program product is further configured for providing, in the user interface, the final version of the generated communication for review after the allocated elements have been processed by the natural language processing system.

According to a yet further aspect, the computer program product is further configured for providing a user input method for adding at least one additional recipient-specific element not included in the original list of recipient-specific pseudo-predefined elements, wherein semantic allocation of said at least one additional recipient-specific element is configured to occur during the semantic allocation of the recipient-specific pseudo-predefined elements.

According to a yet further aspect, computer program product is further configured for providing a method for allowing the user to modify the final version, and for providing a method for receiving a final acceptance of the generated communication from the user for sending the generated communication.

The object of the present invention is to provide a method and apparatus so as to overcome the prior art disadvantages. The objects of the present invention are achieved with a method according to claim 1. The benefits are achieved with a computer program product implementing the embodiments of the method as defined in the dependent method claims. The benefits are further achieved by a non-transitory computer-readable memory that contains computer readable instructions implementing, when run on a processing device, the method as defined in any of the method claims. The objects of the present invention are further achieved with a computer program product comprising computer executable instructions configured to provide a user interface for a natural language processing system for generating natural language communication. Element allocation in the user interface is primarily semantic. In other words, the user interface is utilized to inform the natural language processing system about semantics of the communication to be generated before the communication is generated. A semantic allocation of elements to be used in the communication through the user interface enables semantic and contextual personalization of the content of the communication to be generated without compromising benefit of automated natural language generation speed and accuracy. Syntactic structure of the communication is managed by the natural language processing system during communication generation, and it's not visible to the user.

BRIEF DESCRIPTION OF THE FIGURES

In the following the invention will be described in greater detail, in connection with preferred embodiments, with reference to the attached drawings, in which.

DETAILED DESCRIPTION

Figure 1:
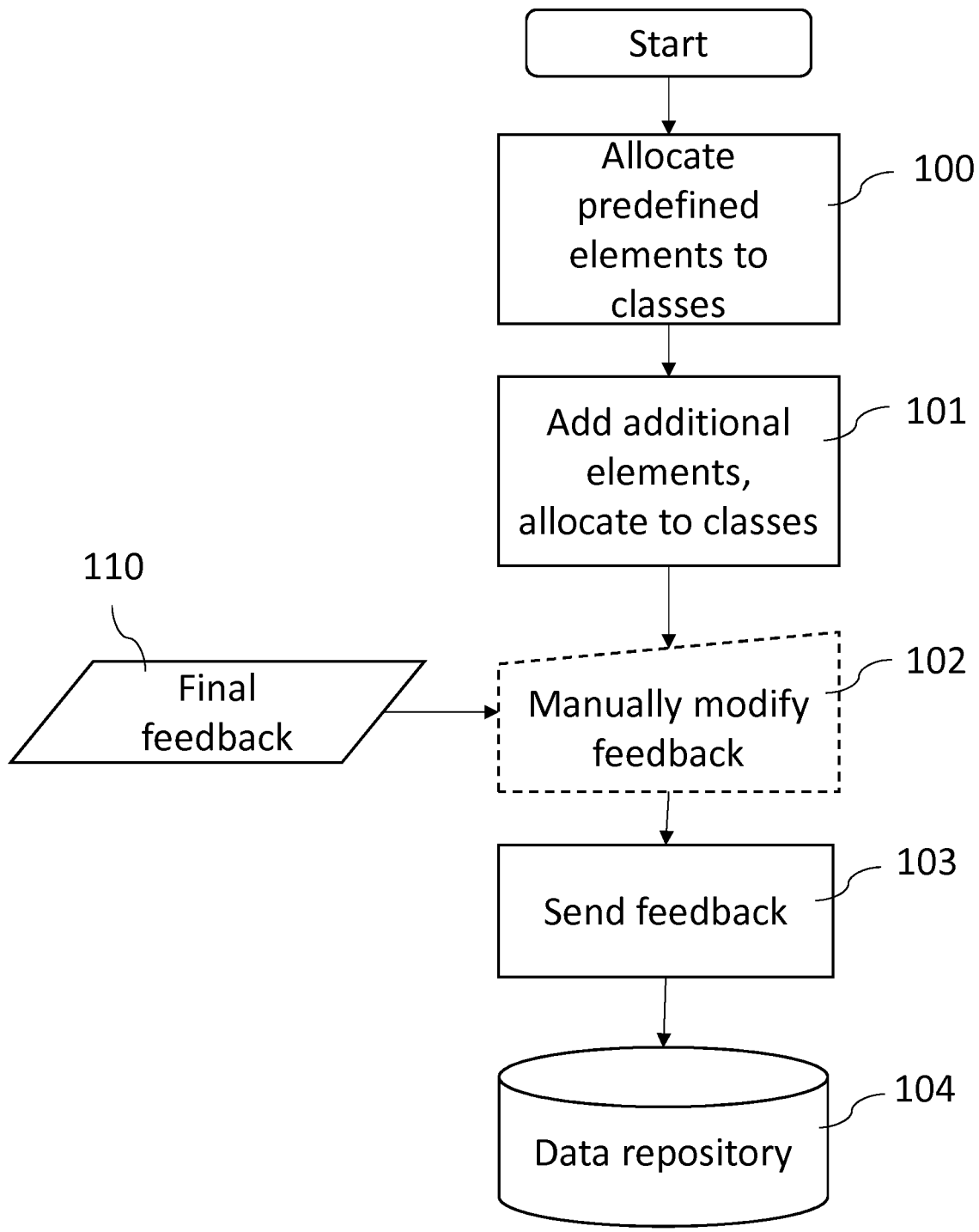
FIG. 1 shows a flow chart describing a method of generating communication as seen by a user.

Term "user" refers to a professional user utilizing an element-based natural language communication tool for generating communication, such as a letter or a message to be sent to a recipient. A user has access to the user interface of the communication tool and uses the user interface for allocation of elements into classes. An example of a user is a company representative such as a Human Resources (HR) professional preparing a feedback letter to a job-seeker.

Term "recipient" refers to a person who receives communication generated with an element-based natural language communication tool, but has no access to the user interface of the communication tool that is used for generating the communication. An example of such recipient may be a job-seeker who receives a feedback letter from the company after sending his/her job application.

Term "element" refers to a characteristic relating to or semantically describing a recipient, and this term is also used to refer to a user interface element corresponding to such characteristic. An element may be semantically allocated to a class by a user of the user interface by using the provided user interface. Elements allocated by a user represent an objective view of the recipient as seen by the user. An element may further be semantically allocated to a class automatically through analyzing recipient related input data. Such automatic semantic allocation may occur for example after the communication tool has collected data of past communication and used this data for machine learning. An element may be a characteristic of a recipient that may be semantically allocated to a class by a user, so that the allocated element that has a semantic meaning in the context of the communication.

Term "variable" refers to data and/or a characteristic relating to or describing a recipient. A "data variable" refers to a variable that is obtained in order to be included in the communication to be generated. Data variable may be visible in the user interface, but it may also be invisible in the user interface i.e. during allocation of elements to classes. Examples of data variables are recipient's name and address. Data variables are typically input in the generated communication as such.

Term "pseudo-predefined" refers to elements that are initially predefined, but which predefinition may be later edited and adjusted in various ways. Editing and/or adjusting of the pseudo-predefined elements may be performed automatically or manually. For example, the communication system may suggest, adjust, remove or add new elements based on machine learning from the earlier communication tool usage history. The elements preselected to be displayed at the user interface may vary depending on the characteristics of the job or the persons involved in the generated communication (recipient, user). Further, the user may create new elements in order to have personal tailoring for the communication.

An "analytics variable" describes a characteristic of the user or the recipient, and is obtained from data analytics or through system configuration. Analytics variables are not included in the generated communication as such, but they are utilized for example for profiling of the user (sender of the message) and/or the recipient based on data analytics and configurations. Such profiling enables adjusting the style and nuances of the generated communication (generated sentences) according to the calculated profiles of the persons involved in the communication. For example, a letter written to a person preferring abstract and theoretical approach receives different communication than a person who is very practical. As a further example, a person seeking a senior manager position may expect different communication style than a teenager seeking for a summer job, and good communication should reflect such difference. An example of analytics variables that may be used are so called BIG 5 personality profile dimensions, well known in area of psychology: openness to experience, conscientiousness, extroversion, agreeableness and neuroticism. If selected dimension(s) would exceed a preset threshold value, this may be used to make decisions on style of the communication to be created, i.e. increasing the probability of certain sentences or fractions of sentences to be selected which are fit to the intended style of communication. Similar analytics may be done for the sender, and the communication system may use these analytics variables of both the sender and the recipient for selecting the communication style that fits best to the personality of both of these persons.

Term "logical class" refers to a specific contextual portion of the communication generated by an element-based natural language communication tool. For example, the logical class may refer to a specific part or paragraph of a letter or message generated by the element-based natural language communication tool. An example of a logical class is an opening or a closing paragraph of a letter, or a paragraph in which a semantically selected group of recipient characterizing elements are discussed. For example a logical class may represent characteristics of the recipient which illustrate the level of motivation of the recipient as seen by the user, or sufficiency of language skills of the recipient for the job at question. Thus, allocation of an element into a logical class may provide the element with both contextual and semantical characteristics or link the element contextually and/or semantically to a specific portion of the communication.

Term "communication" refers primarily to the end result of the process, which is a document used for communication towards the intended recipient. The document may be a letter, which is preferably in a printable form. The letter may be intended to be sent to the recipient electrically, or as a conventional paper letter. The document may be an electrical message, such as an email message or automatically generated lines for purpose of a discussion with a recipient, for example an on-line discussion.

The following description of exemplary use case of the invention is not intended to limit the scope of the invention to this particular example, but rather to provide a sufficiently detailed example so that a person skilled in the art may implement a like system for various purposes.

As an exemplary embodiment and use case of the element-based natural language communication tool, a feedback communication generation method and system is presented, intended to be used for example by human resources personnel or other person hiring an employee (a.k.a. a user) for generating a feedback response communication for a person seeking a job (a.k.a. a recipient).

In a typical personnel hiring process, an application with a resume is provided by the job-seeker and analyzed by HR professional. For many job openings tens, even hundreds of applications arrive to a company. Preparing personal response communication in example in form of letter or a written message is a time consuming job, and automatic systems are sometimes used for providing response to the job seekers. Such automatic systems may provide very standardized communication, which lacks many human communication characteristics. Due to lack of resources, a typical but unfortunate situation is that the communication back to the applicants may be extremely short mass response indicating that "the position is filled and unfortunately you were not chosen". Such non-personal communication may give very bad impression about the company to a job seeker, who may never be interested to seek another job from the same employer again, although he/she might be a perfect match with a future job opening. Further, such communication does not give any feedback to the job seeker on the reasons why he/she was not chosen for the job, and what he/she could improve to be considered as a better candidate next time. Personalization may improve influence of the communication at the same time as it demonstrates positive characteristics of the sender.

Before the user starts generating communication with the element-based natural language communication tool, the tool is configured for the specific purpose, which in this example is recruiting related feedback communication generation. Some system configurations and data may be common to all job openings, whereas some system configurations and data are specific to a particular job opening. Further, some system configurations may be user specific. Before the tool is used for generating communications, system configurations are set and related configuration data is stored in at least one configuration data repository available for the communication generation tool.

In the system configuration phase, the element-based natural language communication tool is provided with various variables for the communication generation. These variables may comprise both data variables and analytics variables. In this example, variables may include basic data identifying the open job, type of the job such as level of requirement (worker, manager, specialist etc.), special words or identifiers to be used in message topic (such as identification code for the specific job opening) and required competences, among other things. Identifier of the specific job opening may be an example of data variable, whereas the level of requirement may be an example of an analytics variable that may be used to define style of the communication, for example. Variables may be received from company data systems such as HR management system, and/or they may be submitted or pre-defined in the tool by a user. The user may further configure the communication generation tool based on his/her individual configuration preferences. The tool may also have some pre-stored data variables, for example standard information such as the company name, location and contact information may be pre-stored and available for any generated communication.

Public data about the job seeker may be obtained from public network sources, such as APIs of social networks such as the Facebook graph API, LinkedIn API as well as other data aggregators. Such public data sources may be used for example for data analytics generating a personality profile of the job seeker. This personality profile may be utilized for example for setting values to analytics variables used later for guiding the style and nuances of the communication, and/or for generating a prediction for class allocation of some elements characterizing the job seeker. Pre-allocation of at least some elements may be used to speed up the communication generation. Performing data analytics on both the user and the recipient enables setting analytics variables that are used for adjusting the style and nuances of the generated communication according to the calculated profiles of both persons involved in the communication: the user or the intended sender of the communication, who may be the user or another person, and the recipient. For example, a letter written to a person preferring abstract and theoretical approach is provided with different communication than a person who is very practical. The user may be profiled in a like manner with the recipient, so that the nuances of the generated communication reflect also the personality of the user/sender of communication.

FIG. 1 shows an exemplary top level flow chart describing a method of generating communication performed by a semantic element-based natural language communication tool, as seen by a user, for example a HR professional.

While the automated part of the communication tool works without any user intervention, FIG. 1 shows parts of the communication generation process that are visible to the user and/or where user input may be received. At the start of the process described here, it's assumed that system configuration has been performed, and at least general input data variables have been obtained and readily available to the communication tool, in example stored in a data repository. Invisible from the user, analytics data may be available to the communication tool, stored in a data repository.

After a specific recipient (job seeker) has been identified by the user for communication generation, in example selected from a list of pre-stored recipients, the user (HR personnel) semantically allocates a number of pseudo-predefined elements characterizing the recipient into classes in phase 100. Semantic allocation of the elements puts the elements into a contextual relation with the recipient. With pseudo-predefined elements we refer to elements that are initially predefined, but which predefinition may be later edited and adjusted in various ways: the communication system may suggest, adjust, remove or add new elements based on machine learning from the earlier communication tool usage history. The elements visible may vary depending on the characteristics of the job or the persons involved in the generated communication (recipient, user). Further, the user may create new elements in order to have personal tailoring for the communication. A graphical user interface may provide a method to add and name such additional elements for example by typing the name of the new element, or by choosing an element from a pool of pre-defined additional elements that were not among the pseudo-predefined elements selected for this recipient or for this user. A voice interface may allow verbally naming new elements to be added and so on. Some of the pseudo-predefined elements may be chosen not to be allocated to classes. In such case, the non-allocated pseudo-predefined elements are omitted from the natural language processing and from the generated communication.

Figure 2A:
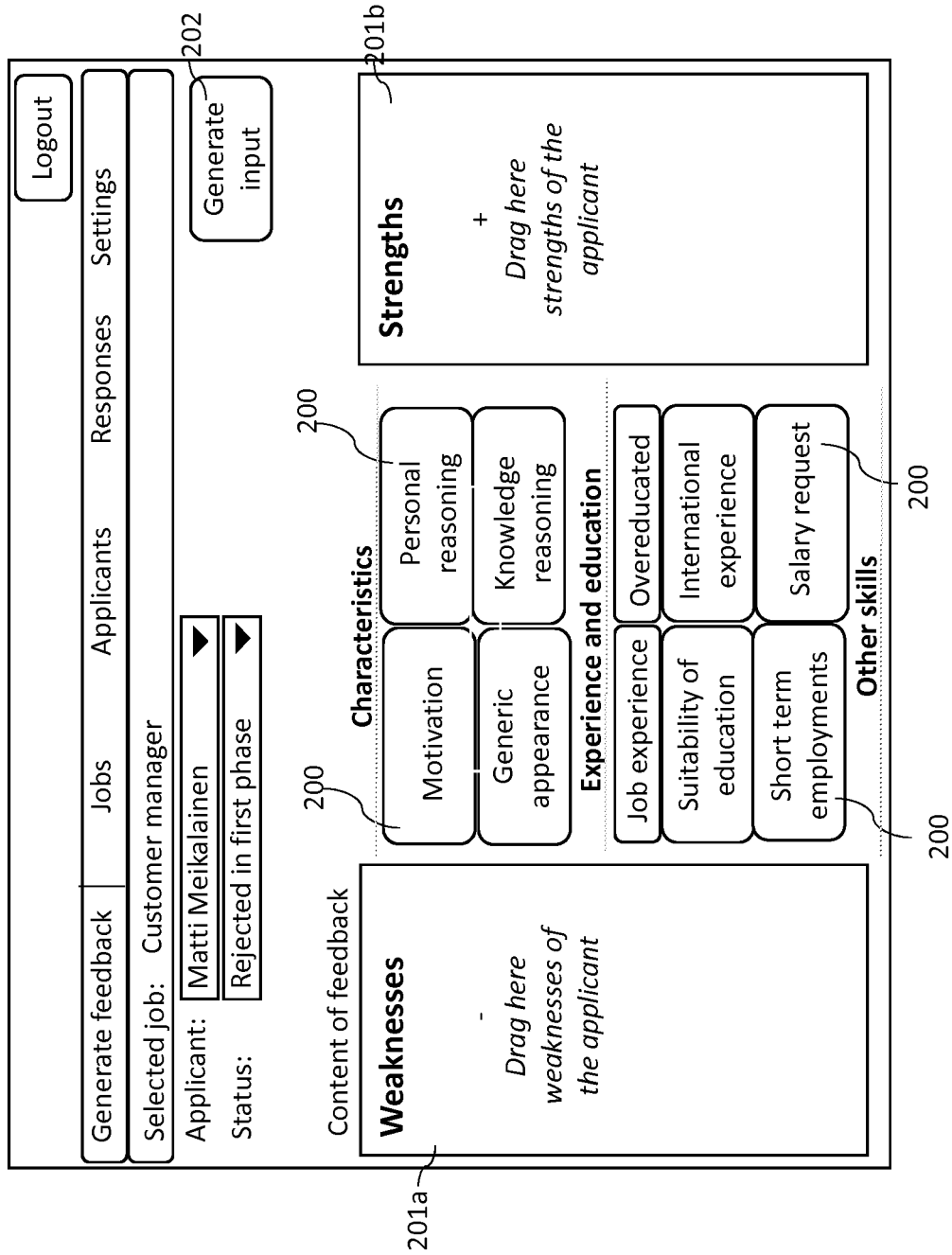
FIGS. 2a and 2b illustrate an example of a user interface configured for semantic allocation of elements.
Figure 2B:
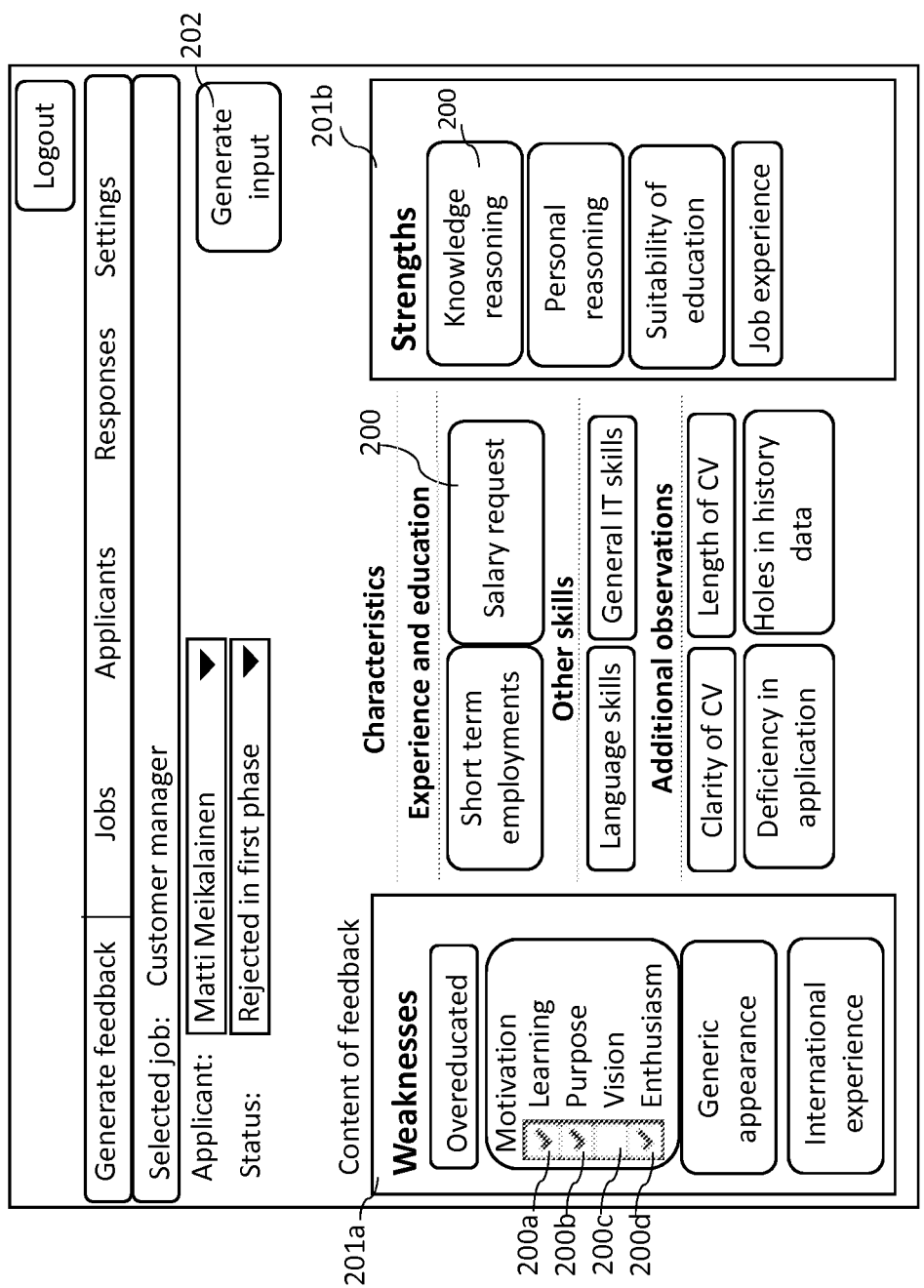

The semantic allocation of pseudo-predefined elements may comprise classifying at least some of the pseudo-predefined element as a strength or a weakness as in this example. This allocation may comprise simple categorization in two or more predefined classes, or it may comprise selecting a point along a continuous axis or a position in a field formed by two different axes. In this example, a graphical user interface is used as an example of the allocation of elements. FIGS. 2a and 2b show an example of a user interface configured for allocation of elements 200 into two classes 201a and 201b. FIG. 2a describes the situation before user has allocated any elements 200 into classes 201a or 201b, and FIG. 2b shows the situation at a later point of time, when at least some elements 200 have been allocated to classes 201a or 201b. Exemplary element "Motivation" includes sub-elements, which may be selected if appropriate. For example, motivation element 200 may be allocated to a class (201a, 201b) as a general top-level element without further analyzing and allocating the related sub-elements (200a, 200b, 200c, 200d). On the other hand, the person allocating the element may choose to itemize the motivation in more detail, thus choosing the sub-elements that he/she finds relevant. In this example, the user has chosen sub-elements Learning (200a), Purpose (200b), and Enthusiasm (200d) as meaningful elements for further defining the characteristic of the top level element Motivation. If none of the sub-elements (200a, 200b, 200c, 200d) are selected, the communication tool will simply use the allocated top level element for communication generation. In a graphical user interface, allocation of elements may be implemented by allowing the user to move the user interface element corresponding to the element 200 carrying the characteristic word or symbol into an area, a field or a specific position corresponding to the class 201a representing a weakness or a specific position corresponding to class 201b representing a strength. This allocation of elements 200 is specific for each recipient, and an important step in bringing the human touch to the communication. The semantic allocation of elements 200 provides towards the natural language system semantic information, which provides contextual knowledge to the natural language processing algorithm. This contextual knowledge is provided towards the natural language processing system through the semantic allocation of the elements a priori to the natural language generation step. The user interface enables allocating of the elements 200 in a fast manner; in this example, the graphical display elements corresponding to the pre-determined elements 200 may be dragged to a class area 201a, 201b with any computer pointing device, including but not restricted to a mouse, a keypad or a touch enabled display.

Alternative types of user interface and alternative methods for implementing the user interface may be chosen, and alternative methods for allocation may be used without departing from the scope. An example of an alternative user interface allows the user to allocate the elements by arranging them into a ranking order in one or more classes.

Figure 7:
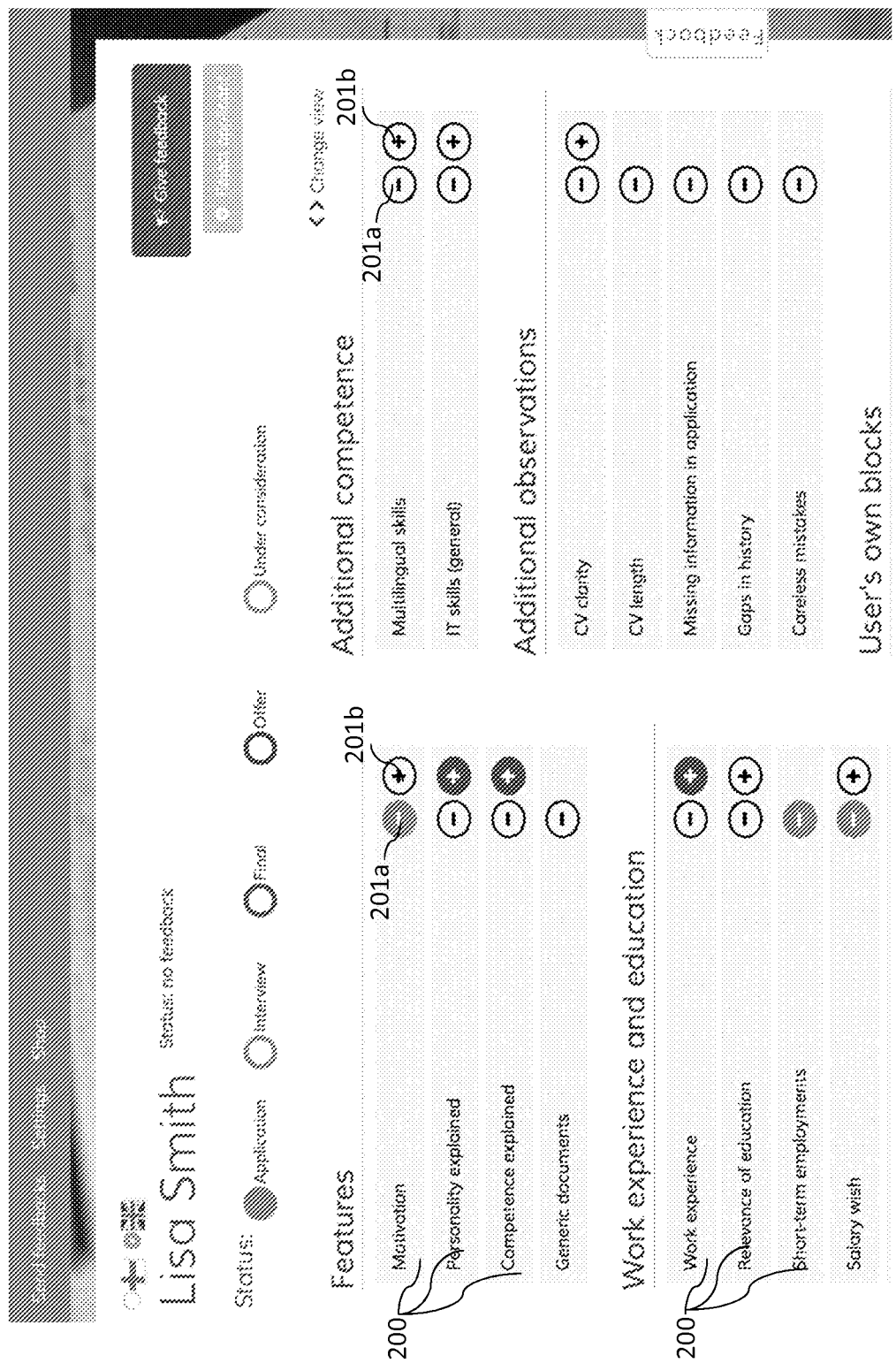
FIG. 7 illustrates another example of a user interface configured for semantic allocation of elements.

Another example of user interview for allocation of elements into classes, illustrated in FIG. 7, is to associate two or more selection buttons, for example toggle buttons or fields, representing the semantic classes (201a, 201b) with each element (200) representation in the user interface. In this embodiment, the user may select one of the selection buttons related to an element for semantically allocating the specific element into at least one class.

Selection of elements 200 to be semantically allocated may be pseudo-predefined. This pre-definition may be based on a general system configuration, or it may be at least partially configured for a specific job or a specific job type or job level. In the present example, said elements 200 have been divided into subcategories (Characteristics, Experience and education, Other skills, Additional observation), which may make the allocation task more structured and thus easier and intuitive for the user. A set of elements 200 is pseudo-predefined for allocation for each job-seeker. All pseudo-predefined elements 200 may be allocated to one of the classes 201a, 201b, but if all elements 200 are not applicable, some may be left unallocated by the user. Such unallocated elements may be excluded from the feedback communication. Although not used for current feedback, information about un-allocation of certain elements may be utilized for machine learning, and similar elements may for example be removed from a subsequent pseudo-predefined list that will be presented to a user at a later point of time with another application that has like characteristics. Un-allocation may also influence the generated text both directly (if element x is allocated without element y it may or may not influence the location and form of element x in the generated feedback) and/or indirectly (via scoring algorithm and optimization of repetition). Elements 200 may have priority setting, and when allocation is made along an axis or two or even along more than two axes, the distance from the origin of the axis may be used to reflect the relative strengths and/or priorities of the elements. A priority describing value may be added to the elements according to the allocation made by the user, or it may be pre-configured as part of the system configuration.

FIG. 2b describes an example of an element, which has multiple related elements 200a, 200b, 200c, 200d with combining characteristics. In this case "motivation" is the main element. The further elements all reflect motivation, but are separate elements. Only some of these elements may be selected; in the current example three related elements (200a, 200b and 200d) have been ticked by the user as sign of selection, but one related element (200c) has not been ticked, and will be thus omitted in later element-based generation of communication.

Continuing description of the method of FIG. 1, in addition to allocating the pseudo-predefined elements 200, the user may choose to add further elements in phase 101, specific to the recipient. Various methods may be used for adding and allocating such further elements, which methods may include at least typing, selecting and dictation.

After the selected elements 200 have been allocated, the user may initiate the generation of the communication by the element-based natural language tool. This may be initiated with pressing in the user interface presented in FIG. 2a "button" 202 by the user. The communication generation process is not visible to the user. As a result of the generation process, a readily written and formulated final feedback communication 110 such as an email or a letter is provided for the user through the user interface, so that the user may review the communication and, if he/she so chooses, he/she may further manually modify the feedback communication in phase 102 before accepting it for sending in phase 103.

When the communication text is accepted for sending to the recipient, information about the communication is stored in a data repository 104. This stored information may comprise a log indicating for example which communication was sent, when, by whom it was sent and who the communication was sent to. User settings may be stored, as well as classification and priority of the elements used for generating this communication. Recipient data may also be stored, as well as employer data. The actual communication material such as a natural language document for example in form of an email or letter may be stored together with applicable metadata related to it. Such metadata may comprise for example the allocated elements and the respective class information from the allocation, as well as used data variables and values of analytics variables. All kinds of further metadata may be included without deviation from scope, and above mentioned stored information may also be stored as metadata. The communication material is preferably in printable form.

Figure 3:
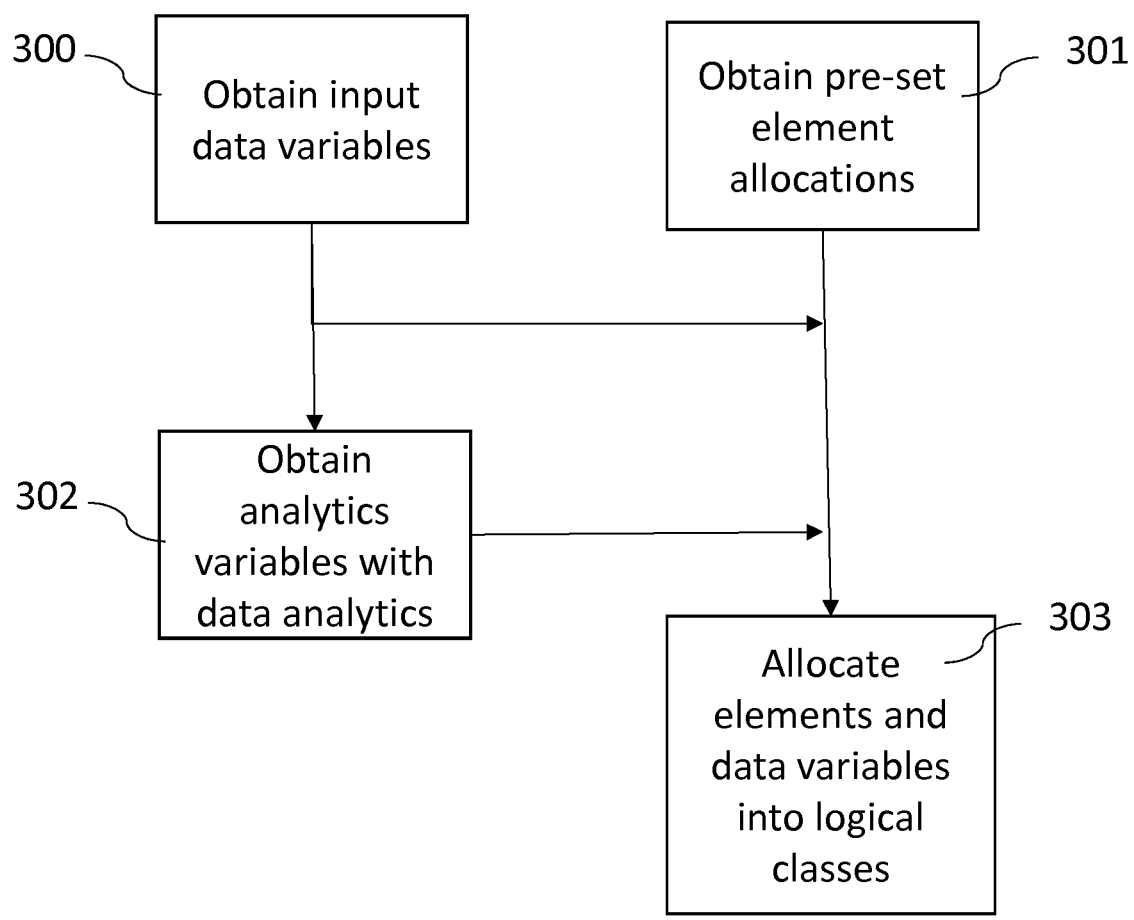
FIG. 3 describes a process for collecting variables and elements.

FIG. 3 describes an exemplary process for collecting variables and elements for generating a communication with the element-based natural language communication tool.

The communication tool utilizes several sources of data and elements. Combining such various sources of data facilitates creation of communication that, in addition to fulfilling the basic requirements for natural language, includes a human characteristic for the communication that is found important for influencing the recipient. Thus, the communication tool enables utilizing automated natural language processing tool without resulting a non-personal communication document. The communication tool obtains input data variables available through system configuration in phase 300. Obtaining may mean for example fetching data from a data repository or receiving data variables through a user interface. In the used example of job-seeker feedback communication, the input data variables may comprise for example job name, company name, job or position specific hard and soft competences, and even some elements invisible to the user. Examples of invisible elements may be different styles of greetings, different sentences to thank the recipient for the application, and different ways to end the generated message. Such invisible elements may be adjustable for example in user's personal settings or in more general system settings, but these are not normally visible in the user interface and not available for the user to allocate. Data variables also contain recipient identifying data, such as recipient name. Selected data variables, such as recipient name may also be utilized in phase 302 for data analytics, which may provide analytics variables for the communication generation process. Data analytics may produce analytics variables describing personality profile of the recipient, infographic describing job seekers, which may be utilized for generating further analytics variables, predicted strengths and weaknesses which may be used for generating invisible or pre-configured elements to be used in the process and so on. Source material for data analytics may be for example received job application documents, cover letters, video resumes and CVs, which may be compared with respective element allocation data received from HR professionals. By semantically analyzing the related source material against the element allocation data, analytics variables may be generated that reflect the potential for the job applicants in different business sectors, enterprises, geographical areas and so on. Based on the data collected, the communication system may even suggest other, perhaps more suitable jobs for the applicant, suggest potential persons for a job to the company and/or help the applicant to adjust their application contents and style to better fit to the purpose and the type of jobs she/he applies to.

In phase 301 the user provides semantic allocations for the predefined or pseudo-predefined elements for the communication tool. These recipient-specific elements, which characterize individual characteristics of the recipient as seen by the user, comprise the visible elements that may be semantically allocated to classes by the user. Result of the semantic allocation is obtained and stored in a working memory for each element that was allocated to a class. Further elements may be provided that are invisible to the user. As mentioned earlier, all pseudo-predefined elements do not have to be semantically allocated by the user, but some may be omitted and thus not included in the communication generation by the NLP system. With working memory we refer to any memory device or several memory devices where the data may be stored, accessed and again removed after use, such as a SSD, RAM or DRAM.

Data variables and elements obtained through any of the phases 300, 301 and 302 are allocated to logical classes in phase 303. This allocation of data variables and elements into logical classes may occur as a single process step, or allocation to logical classes may occur at need basis, whenever new data variables or elements are available from any of the phases providing data variables and/or elements. All elements and data variables relating to a specific communication to be generated are stored in the working memory, where they may later be selected for processing and/or moved or copied to a permanent data repository (104) so that they may be removed from the working memory after they are not needed any more for communication generation. The elements may further be stored in a permanent data repository (104) together with the communication data as described earlier in relation to FIG. 1. As known by a person skilled in the art, the used elements and/or data variables may for example be flagged or tagged as "used" in many various ways. The handled items may be moved to a permanent data repository right after they have been processed, or the handled items may be kept in the working memory until they are all moved to a permanent data repository (104) after the communication generation process has been finalized. Handling the data stored in the working memory may be implemented in many alternative ways without departing from the scope.

As one example of the allocation of elements and data variables to logical classes, data variables containing the first name and the family name of the recipient are allocated to the greeting logical class.

An element may be allocated to a logical class based on the semantically allocated class. As an example of this, the elements semantically allocated to strengths are placed in the "strengths" logical class and the elements semantically allocated to weaknesses are placed in the "weaknesses" logical class. If an axis is used for element classification, a level of classification is linked with each respective element. Such level of classification may be a numerical value related to the element. Level of classification may be used either for allocation into a logical class or for setting a priority for the element within the logical class, or for both purposes.

Allocation of an element into a logical class may be at least partially automated, so that in normal use situation, the allocation is done without intervention of the user. Such automatic allocation may be based on a scoring system, where different elements are scored based on predefined priority values, which are linked to all elements. Priority value given to an element may depend on the semantic class into which the element was first allocated by the user. An allocation scheme may define how different priority values are allocated to different logical classes.

Figure 4:
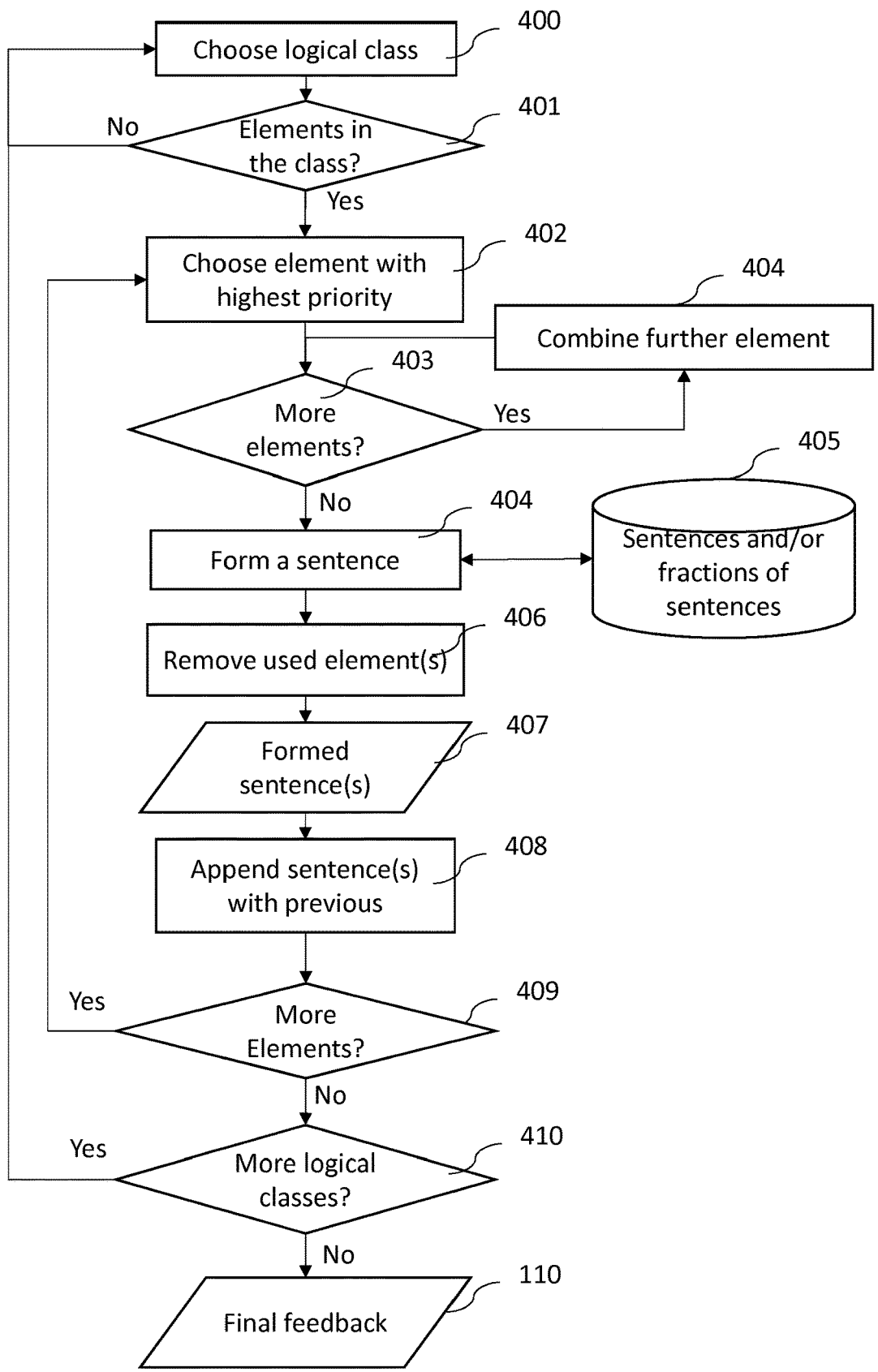
FIG. 4 illustrates a method for implementing the automatic communication generation method performed in the element-based natural language communication tool.

FIG. 4 presents an exemplary embodiment of implementing the automatic communication generation method performed by the semantic element-based natural language communication tool. The automatic communication generation method utilizes the user-allocated elements, together with data variables and analytics variables obtained, in a looping and/or an iterative process utilizing a natural language processing (NLP) database that comprises rules for forming sentences and algorithms forming sentences. The algorithms ensure, for example, that there is no unnecessary repetition of sentence parts or elements in the generated communication, but that sentences have plenty of variation in form. With term looping process we indicate that the sentence building algorithm may work as a loop process, creating sentence for the currently selected elements and then returning to start of the loop for handling next elements. The sentence building process may further contain iterative characteristics for example for optimizing (reducing) repetition by post processing the initially generated sentences. Iteration is not necessary for avoiding repetition, since a suitable randomized looping algorithm may also ensure sufficient level of uniqueness of the created communication. Analytics variables may be utilized for controlling the sentence formation process and sentence algorithms, so that the style and nuances of communication become fit for the specific need and for the specific user and recipient. Data variables allocated to logical classes may be used for forming the sentences in similar manner as the elements. In foregoing description, we may use common term "elements" both for elements and data variables used in the sentence generation, as these are handled in a like manner in view of the sentence generation process.

Obtained and stored data variables and elements are processed by the NLP system, in order to include them in the generated communication. Analytics variables are utilized in the process for adjusting the language. Generated communication is built piece by piece based on a set of predefined logical classes, into which all data variables and user allocated elements have been semantically allocated. Similarly to the semantic allocation classes, the logical classes may also be changed by the user prior to generation of the communication with the NLP system, so that also logical classes may be referred to as being pseudo-predefined, in other words logical class are initially predefined but changeable. For example, a user may affect the logic used with the NLP system by adding a new logical class or removing one. For example, if the generated communication is a letter or an email, the logical classes define the logical parts of the communication. In the used example of a feedback letter for a job-seeker, these may comprise but are not limited to greeting, a thank-you portion, general information, job seeking status information, strengths, weaknesses, transition phases and an ending. Thus, logical class defines also context of the elements allocated in the logical class in addition to being a semantic allocation. When a user adds or removes a logical class, communication generated by the NLP system changes accordingly. Each data variable and/or element allocated to one of the logical classes is handled and the respective sentences are built to include the data variables and at least semantic meaning of the allocated elements. For language variability, the communication generated may use alternative wordings to indicate the semantic meaning of a particular element allocation rather than use the word shown in the element in the user interface.

The semantic element-based, automated communication generation process utilizing natural language processing begins with choosing a logical class in phase 400. For simplicity, we'll just refer to elements in the foregoing description, but the process applies to data variables as well.

If the logical class is found to include elements in phase 401, the element with highest priority is selected and copied from the working memory to a temporary list of currently selected elements to be handled first in phase 402. The elements copied to the list of current elements may be marked in the working memory as handled, so that they may be omitted during subsequent loop rounds. When the communication generation method is executed for a specific logical class, elements relating to this logical class are handled in a priority order. This way, elements that are considered important appear in the communication first within their respective logical class, which is a characteristic feature of natural communication. Elements with equal priority are handled in random order. Next, the process checks in phase 403, whether there are related elements that have combining characteristics with the element chosen based on priority. If so, the related elements are copied from the working memory, marked as handled in the working memory and appended in phase 404 to the list of currently selected elements and all elements in the list of currently selected elements are handled as a set together with the chosen element with highest priority. For example, elements describing job-seekers language skills may be handled as a set of related elements although they may include both strengths and weaknesses. Another example of related elements may be seen in FIG. 2b, where element motivation has multiple related elements (200a, 200b, 200c, 200d). When "motivation" is selected for sentence generation according to priority in the suitable logical class, the user selected related elements (200a, 200b, 200d) may be handled as related elements and included in the same sentence with the main element "motivation". After the elements in a set of related elements have been chosen for handling according to the priority scheme and stored to the list of currently selected elements, a sentence is formed in phase 404 containing these elements. At least one sentence is formed in phase 404 according to sentence formation rules and sentence processing algorithms by obtaining sentences and/or fragments of sentences stored in a sentence database 405, including in the sentence all chosen elements stored in the list of currently selected elements, resulting to at least one new formed sentence 407. Sentence database 405 may contain sentences and/or fragments of sentences for different lingual versions that are parsed during the sentence forming phase 404 into sentences containing the data variables and/or elements according to the sentence formation rules. The sentence database 405 may further contain sentence formation modules and/or algorithms. A fragment of sentence may comprise multiple words or a single word. In an alternative embodiment, instead of using a sentence database 405 as described here, the sentence formation rules and sentence processing algorithms may use other techniques for generating natural language sentences. For example, natural language may be generated letter by letter with a suitable advanced algorithm. The sentence formation rules and sentence processing algorithms utilize the analytics variables for adjusting the style and nuances of the sentences generated. Such style adjustment may be implemented by making decisions on selection of used sentences or fractions of sentences based on values of the analytics variables. Elements used for generating the sentence may be removed in phase 406 from the list of currently selected elements after they have been included in the sentence. Removal of the already used elements may occur simultaneously with or after forming of the sentence(s), or it may occur one by one or in a single step common for all elements stored in the list of currently selected elements. The newly formulated sentence(s) (407) is/are then appended in the communication under generation after any previously generated sentence(s) in phase 408. After generation of the current sentence(s) has been finalized and the generated new sentence(s) (407) has been appended to the communication under generation, the process checks in phase 409 whether there are further elements in the present logical class stored in the working memory that have not been handled yet. If there are more elements, the process returns to phase 402 and generates next sentence(s) using at least the element in this logical class that has the highest priority among the still unhandled elements. If all elements in this logical class are found to be handled in phase 409, the process will proceed to phase 410 to check whether there are more logical classes to be handled. If there are more logical classes, the process restarts from phase 400, choosing next logical class for handling and looking for the elements and/or data variables for handling in priority order. If all logical classes are found to be handled in phase 410, the feedback document 110 generated by the element-based communication generation process is final and ready to be returned for example to the user for review and acceptance.

Instead of a traditional NLP algorithm, the sentence database 405 used by the sentence generation algorithm may comprise a logical tree structure configured for a specific language and for a specific use case. This type of approach may be preferred for certain languages depending on the grammatical structure and morphology of the language. A more traditional NLP algorithm may be useful for some other languages. The tree may comprise sentences and fractions of sentences that are completed by adding suitably formatted (i.e. grammatically correct forms of) words representing the elements and/or data variables in them. Correct formatting of the words representing the elements is particularly important in languages in which the format of the word depends on context and use of the word in a sentence. Examples of such modification of words is for example inflexion of the word based on tense, mood, voice, aspect, person, number, gender and/or case. Elements may represent nouns or adjectives, which may be subject to declension. Or elements may represent verbs, which may be subject to conjugation. By using probabilistic methods, different branches of the tree structure may be selected for the sentences to be generated in order to generate the natural variation in the communication. Several probabilistic methods are known by a person familiar with the art. To name a few examples, various Markov models and/or hidden Markov models (HMM) with Markov chains (and memory) of sufficient order and/or various mixed memory Markov models may be applied.

Figure 5:
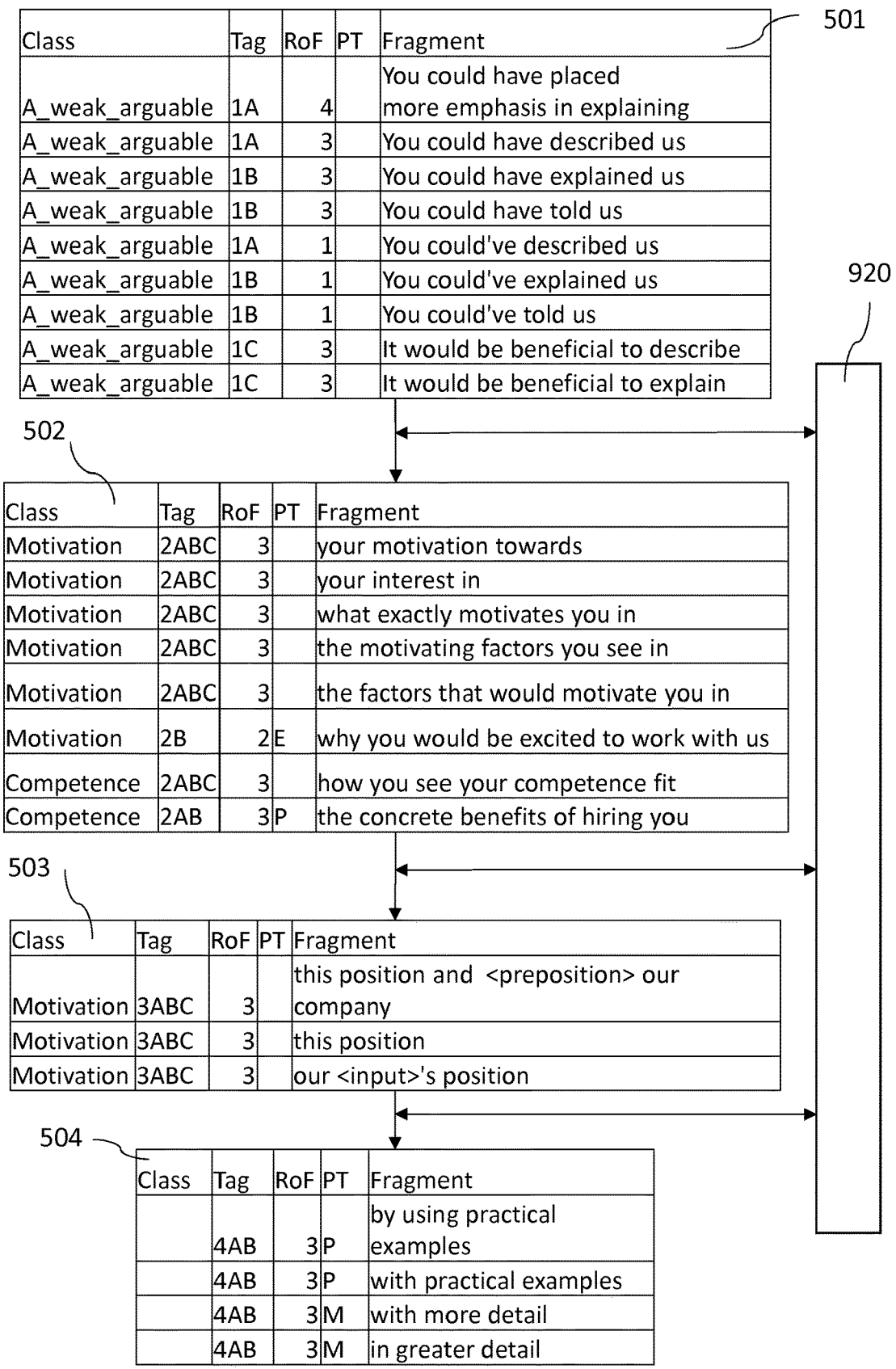
FIG. 5 illustrates an example of sentence generation by the element-based natural language communication tool.

FIG. 5 illustrates an example of a sentence generation method by the element-based natural language communication tool, demonstrating the principle for building a sentence based on semantics of the allocated elements, wherein the method enables both adjusting nuances and creation of great amount of variance in the resulting sentences. In this example, we'll use term fragment for any sentence or fragment of sentence in column "Fragment", whereas term sentence refers here to the whole sentence to be generated. This example also describes how nuances may be adjusted for different types of recipients. For simplicity, we'll use just a limited number of types of recipients in this example.

The user, i.e. the user, in other words a person who gives feedback towards the recipient has semantically allocated the "general motivation" element to class "weakness" and has not specified that element further. This allocation may be interpreted that lack of motivation is an element that is considered as a general level weakness of the applicant. The same sentence formation model may apply to another characteristic, in this example competence could be an example of other applicable element using same sentence formation structures.

Tables 501, 502, 503, 504 are stored in the sentence database 405. The selection process performed by the data processing modules processes the data based on defined values of Tag, Rate of Formality (RoF) and possible Personality Tags (PT). Class is used for choosing the right tables for the specific classified element(s) that are currently being processed. In this example, we have chosen for this example tables 501, 502, 503 and 504 that contain fractions that are designed for generating sentences relating to weakness or arguable weakness of motivation and/or competence.

In table 501 all presented fractions are eligible with the allocated motivation element related to weakness or arguable weakness of general motivation. This exemplary table shows just a few exemplary fractions to keep the example simple. The sentence is built in numerical order, picking first a fraction among those stored in table 501 having a Tag with form 1*, then picking one from table 502 having a Tag with form 2*, picking next one from table 503 with a Tag having form 3* and possibly adding one more fraction from table 504 with a Tag having form 4* if appropriate. Fractions in table 501 each have a Tag (1A, 1B, 1C). The letter in the Tag defines a grammatical family for the sentence to be created. We may call these as grammatical family A, B and C respectfully. Next tables 502, 503, 504 also include Tags, that comprise one or more letters (2ABC, 2AB, 2B, 3ABC, 4AB). When a sentence is generated with the exemplary tables, the Tag (1A, 1B, 1C) indicating the grammatical family chosen from table 501 creates a selection criteria for the subsequent tables 502, 503, 504. If a fraction with Tag 1A was first chosen, only fractions belonging to the grammatical family A, i.e. having a Tag with letter "A", may be chosen from the subsequent tables for this specific sentence: Tags 2ABC, 2AB, 3ABC, 4AB may be used, but fraction with Tag 2B is not acceptable in combination with the exemplary fraction with Tag 1A. Similarly, if a fraction with Tag 1C was chosen from the first table, only fractions with Tags 2ABC, 3ABC may be used with it. In this example, we can thus form the sentence from fractions corresponding to increasing Tag numbers (1, 2, 3, 4) that belong to the same grammatical family (A, B, C, D). First selection of the grammatical family may be based on random selection. A scoring system may be further added to control the selection based on the grammatical family used for creating the previous sentence.

For a specific communication, a further guide for the selection of a subset of all available fractions of table 501 may be chosen based on the formality characteristic (RoF, Rate of Formality). This characteristic thus adjusts a nuance aspect of the communication. The Rate of Formality value may be received as an analytics variable. A highly formal person would preferably receive a letter where this element would be addressed by starting with a fraction having a Rate of Formality (RoF) of 4 or 3. A casual person would more likely be approached with a letter where this element would be communicated by choosing a fraction having a Rate of Formality of 1. This formality selection may set in user settings, i.e. the user may define in the settings which formality categories are allowed for the selected communication. In example, the user may choose that Rate of Formality (RoF) may be between 2 and 4, so that the most informal choices would not be selectable. In total we can find that by using tables 501, 502 and 503 for generating sentences, even if excluding Rate of Formality (RoF) 1, a total of 6*5*3=90 different variations of this single sentence related to one allocated element may be chosen. It should be understood, that this is a simplified example only to illustrate the basic methodology, and an actual sentence database 405 may provide much more alternatives in each table, providing thousands of possible variations for a single sentence generated for an element.

Further sentence formation criteria may be received through using analytics variables. One example of further selection criteria is described in tables 502 and 504. Here, a Personality Tag (PT) is added to selected fractions. If the recipient has been analyzed to have a specific personality characteristic, a fraction having a corresponding Personality Tag (PT) may be chosen. In this example, a personality tag "P" marks fraction that is preferred, or may be added for a pragmatic person. If a threshold for "pragmatic" has been exceeded in the data analysis for the specific recipient, this may be taken into account while choosing the fractions for the communication to be generated. In Table 504 we may see fractions that all have a specific Personality Tag. These fractions would only be selected if the recipient had this Personality Tag attached to him/her.

Thus, a sentence built for a person without a "P" Personality Tag could be i.e. "You could have described us your interest in this position", whereas a person classified to be pragmatic and having a "P" personality Tag could read: "You could have explained us how you see your competence fit this position by using practical examples". As this example shows, adding the Personality Tag (PT) in the selection criteria further increases the amount of possible sentences to be created.

The table structure with suitable fields as described may be considered as an example of a tree structure containing fractions of sentences (fractions), which may be used for generating complete sentences (sentences). For example, the grammatical class of the first selected fraction may be considered as the trunk of a selected tree, and the fractions in different grammatical families may be considered as the branches of the tree. Instead of using this kind of table format to implement the tree structure, various alternatives may be used, as known by a person skilled in the art, without departing from the scope.

At least one sentence processing module (920) contains information about the previous sentences and the currently processed sentence. Fragment selection is based on computational scoring: fragments are scored based on frequency of use of at least some of the words comprised in the fractions in previous sentences and/or in the fragments of the same sentence. This way unnecessarily repetition can conveniently be avoided and variability of the generated sentences is optimized. The fragment scoring highest i.e. the "best possible" fragment is chosen, or if multiple fragments fulfil the requirements by meeting a given fragment scoring threshold, any of these may be randomly chosen. The computational profile of the sender and the recipient, for example the analytics variables related to the sender or the recipient, may further affect the fragment scoring algorithm and thus the fragment selection.

Table 503 contains further an example of a preposition (<preposition>) in the Fragment. Prepositions may be at least partially handled by sentence processing algorithms. Additional input fields (<input>) may be used in the fractions. In this simple example, the input (<input>) may be a data variable including the title of the job that was applied for.

Sentence processing algorithms may further handle punctuation, spacing and inclusion of special characters, but some of this may even be included in the fractions themselves.

A further way to create variation in the sentence is to allow sentence to be terminated without using all available tables for generating the sentence. For example, the sentence generation process could use just fractions from tables 501 and 502, like "It would be beneficial to explain the concrete benefits of hiring you".

Above table example also highlights that although the elements are displayed as simple characteristics in the user interface during allocation, are not necessarily used as such in the generated communication. Elements are semantic, and not necessarily used as such to populate given positions in fixed templates as seen in many automated systems. For example, a sentence generated for lack of motivation with the tables of FIG. 5 does not necessarily have word motivation in it at all: word motivation can only be found in four fragments out of eight in the table 502. In other words, the generated sentence put the semantic meaning of given semantic allocation of the element into a context describing the characteristic.

Figure 6:
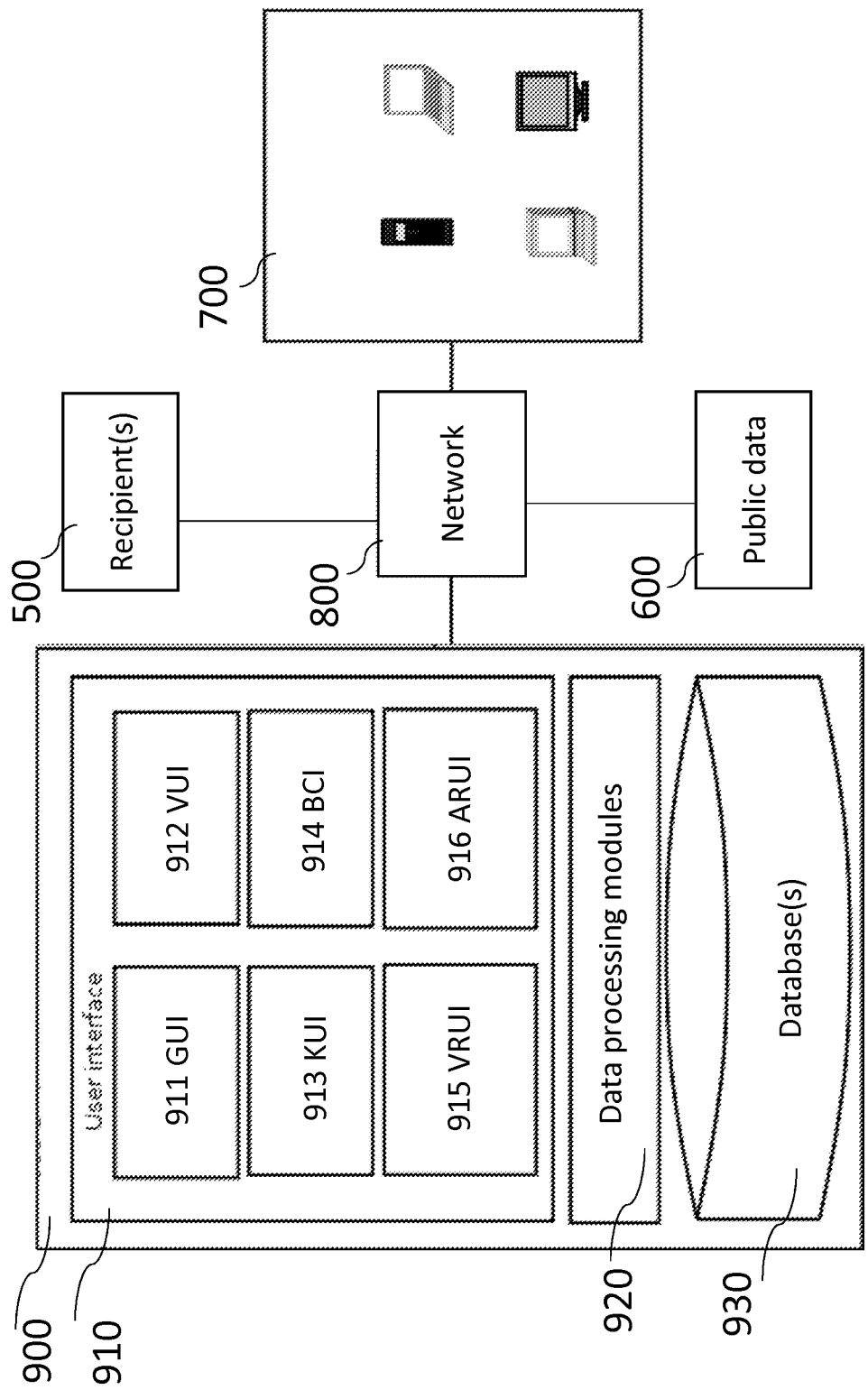
FIG. 6 illustrates a computing system which may be used to implement the element-based natural language communication tool.

In FIG. 6, a computing system 900 is described which may be used to implement the element-based natural language communication tool. The computing system 900 is configured to connect to a network 800 (Internet and/or intranet) and provide one or more client devices 700 with a user interface 910. The user interface 910 provides the user a way to interact with the computing system. A client device 700 may be an information handling system device including, but not necessarily limited to: a mobile computing device (e.g. a laptop computer, a netbook computer, a tablet computer, a mobile telephone device and so forth), a multimedia device, an e-book reader device, a surface computing device, a personal computer (PC) device, and so forth. One or more client devices 700 may be associated with a user. Network 800 allows exchange of data between the computing system 900 and the client devices. A user may communicate with the computing system 900 via the network 800 using a client device 700, and the users may also communicate with each other via the network using client devices 700.

Data on individual user and data provided by the user is gathered from client devices 700 via network 800 to at least one data repository 930, which data is stored into data repository 930 at least as variables and elements, and processed by data processing modules 920. Communication with the recipients 500 is carried over the network 800. Data on recipients 500 may be gathered from public data 600 and/or from client device(s) 700 via network 800 and stored to at least one data repository 930 as data variables, elements or analytics variables. The at least one data repository 930 may comprise sentence database 405 containing sentences and fragments of sentences for different lingual versions that are parsed according to the sentence formation rules utilized by the data processing modules 920. User settings and logs as well as produced and modified natural language messages and element metadata are examples of data that is stored in at least one data repository 930. At least one data repository 930 may include the working memory for storing the elements and variables utilized by the element-base natural language communication tool, but the working memory may also be arranged separately for the data processing modules 920. At the least one data repository 930 may also include the configuration data repository and a sentence database 405. Further, the at least one data repository 930 may include the permanent data repository 104. Data repository 930 may comprise a single memory device capable of permanent storing of data, or it may comprise a number of memory devices capable storing data permanently or temporarily. Data repository 930 may be a database, or a virtual database in a cloud computing environment, or it may represent several different virtual databases or memories in a cloud computing environment.

Data processing modules 920 contain algorithms that may include, but are not limited to the following functions: natural language processing (sentence formation rules for different lingual versions and sentence processing algorithms), optimization of repetition, post-processing of natural language text or speech, speech recognition, speech to text translation, text to speech translation, video analytics tools, modification of pseudo-predefined elements (based on user and recipient data), user selection forecasting and automatic element assignment as well as automatic natural language response formation. Data processing modules 920 allow e.g. profiling of the user and the recipients and automatic adjustment of the style and/or nuances of the natural language processing according to these profiles. These kinds of nuances mimic e.g. typical communication of different socioeconomic classes and psychological preference profiles in order to maximize the influence of the processed message.

The user interface 910 may comprise any one of a graphical user interface (GUI) 911 (e.g. visual elements), a voice-user interface (VUI) 912 (e.g. speech recognition), a kinetic user interface (KUI) 913 or a brain-computer interface (BCI) 914 (e.g. controlling the system 900 with the mind with sufficient peripherals), a virtual reality user interface (VCUI) 915, an augmented reality user interface (ARUI) 916 or any combination of these. The user interface 910 presents towards the user pseudo-predefined elements that may either be fully or partially predefined initially and/or the predefinition of these elements might vary depending on the input of the user and/or data processing modules 920.

It is apparent to a person skilled in the art that as technology advances, the basic idea of the invention may be implemented in various ways. The invention and its embodiments are therefore not restricted to the above examples, but they may vary within the scope of the claims.

The invention claimed is:

1. A method implementable on a computing device configured for generating natural language communication to be output for or electronically sent to a recipient, the communication comprising natural language processing system generated natural language sentences, the method comprising:
   displaying in a user interface a first number of recipient-specific pseudo-predefined elements;
   receiving, through the user interface, a semantic allocation by a user of at least part of said first number of recipient-specific pseudo-predefined elements into at least two different classes;
   further allocating said semantically allocated elements into at least one logical class, said logical class defining for each semantically allocated element a specific portion and/or context of said communication to be generated; and generating at least one natural language sentence in each logical class containing at least one of said semantically allocated elements, said at least one natural language sentence including at least one of said elements allocated to the respective logical class in said at least one generated sentence and a semantic meaning of said elements allocated to the respective logical class, until at least the semantic meaning of all elements semantically allocated into one of the logical classes have been included in said natural language sentences in the natural language communication, wherein that the method further comprises:

at least one of suggesting, adjusting, removing and adding new pseudo-predefined elements based on machine learning from earlier use of the natural language communication generation method so that the pseudo-predefined elements displayed in the user interface are varied depending on the recipient; and wherein the semantically allocated elements equal said first number of pseudo-predefined elements; or the amount of semantically allocated elements is less than the first number of said pseudo-predefined elements, and the unallocated pseudo-predefined elements are not included in the generated sentences; or the number of semantically allocated elements contains at least one additional element that was not included in the first number of pseudo-predefined elements, wherein said user interface is configured to allow the user to add the at least one additional recipient-specific element into the recipient-specific pseudo-predefined elements, and wherein semantic allocation for said at least one additional recipient-specific element to one of said at least two different classes is received during allocation of the recipient-specific pseudo-predefined elements.

2. The method according to claim 1, wherein the method further comprises:

obtaining at least one analytics variable describing personality of the recipient and at least one analytics variable describing personality of the user; and adjusting the style of the generated sentences based on the analytics variables.

3. The method according to claim 1, wherein the method further comprises:

obtaining a second number of recipient-specific data variables;

allocating said data variables into at least one logical class; and generating at least one natural language sentence in each logical class containing at least one of said allocated data variables or at least one of said semantically allocated elements.

4. The method according to claim 1, wherein the method further comprises handling the logical classes in a preset order corresponding to a logical structure of the communication to be generated;

selecting a semantically allocated element for sentence generation within the respective logical class in a priority order; and storing said selected element in a list of currently selected elements, wherein the highest priority element is selected first for storing.

5. The method according to claim 4, wherein the method further comprises:

selecting further semantically allocated elements to be included in sentence generation together with the element selected based on the priority order, if the further selected elements have a combining characteristic with the element selected based on the priority order; and storing said further selected elements in the list of currently selected elements.

6. A method according to claim 4, wherein the method further comprises:

forming at least one sentence including the selected elements in the list of currently selected elements or the semantic meaning of the selected elements in the currently selected elements by parsing said at least one sentence according to sentence formation rules, wherein said forming utilizes sentences or fragments of sentences stored in a sentence database;

removing used elements from the list of currently selected elements; and appending the at least one formed sentence in a generated communication after earlier formed sentences.

7. The method according to claim 1, wherein the method further comprises:

providing, through the user interface, a final version of the generated communication for review after all semantically allocated elements and all logical classes have been processed, and all said semantically allocated elements have been included in the generated communication; and allowing the user to modify, through the user interface, the final version of the generated communication prior to accepting the generated communication for sending.

8. The method according to claim 7, wherein the method further comprises:

sending the generated communication to a recipient; and storing the generated communication in a permanent data repository together with log information and metadata related to the generated communication.

9. The method according to claim 1, wherein the method further comprises:

forming sentences based on a tree of predefined sentences or fractions of sentences;

using one or more probabilistic methods for selecting different branches of the tree of predefined sentences and fractions of sentences for the sentences to be generated; and completing the formed sentences by adding suitably formatted words representing the selected elements or data variables in the formed sentences.

10. The method according to claim 9, wherein said probabilistic methods comprise:

computational scoring of sentences or fractions of sentences in order to facilitate selection among said sentences or fractions of sentences; and selecting the sentence or fraction of sentence that gets the highest score based on said computational scoring, or selecting randomly a sentence or a fraction of sentence whose computational score exceeds a set limit.

11. The method according to claim 10, wherein said computational scoring gives score to a sentence of a fragment of sentence based on at least one of:

frequency of use of a word in the fraction in previous sentences; and frequency of use of a word the fraction in other fragments of the same sentence.

12. The method according to claim 10, wherein said sentences or fractions of sentences are selected based on at least one of:
- the class into which the element was allocated;
- a tag defining a grammatical family of the sentence or the fraction of sentence;
- a tag defining rate of formality of the sentence or the fraction of sentence; and
- a personality tag.

13. A computer program product embodied on a non-transitory computer-readable medium implementing the method according to claim 1.

14. A computer program product embodied on a non-transitory computer-readable medium comprising computer executable instructions configured to provide a user interface for a natural language processing system configured for generating natural language communication to be output for or electronically sent to a recipient, the communication comprising natural language processing system generated natural language sentences, the computer program product being configured for:
- displaying in the user interface a first number of recipient-specific pseudo-predefined elements;
- receiving, from a user through the user interface, semantic allocation of at least part of said recipient-specific pseudo-predefined elements into at least two different classes;
- providing for the natural language processing system information about said allocation of the elements; and
- receiving from the natural language processing system a final version of the automatically generated communication, the final version of the communication including at least the semantic meaning of all elements semantically allocated into one of the logical classes, wherein
- the computer program product is configured for at least one of suggesting, adjusting, removing and adding new pseudo-predefined elements based on machine learning from earlier use of the natural language communication generation with the computer program product so that the pseudo-predefined elements displayed in the user interface are varied depending on the recipient, and wherein
- the semantically allocated elements equal said first number of pseudo-predefined elements; or
- the amount of semantically allocated elements is less than the first number of said pseudo-predefined elements, and the unallocated pseudo-predefined elements are not included in the generated sentences; or
- the number of semantically allocated elements contains at least one additional element that was not included in the first number of pseudo-predefined elements, wherein said user interface is configured to allow the user to add the at least one additional recipient-specific element into the recipient-specific pseudo-predefined elements, and wherein semantic allocation for said at least one additional recipient-specific element to one of said at least two different classes is received during allocation of the recipient-specific pseudo-predefined elements.

15. The computer program product according to claim 14, said computer program being further configured for:
- providing, in the user interface, the final version of the generated communication for review after the allocated elements have been processed by the natural language processing system.

16. The computer program product according to claim 14, wherein the user interface provided by said computer program product is further configured for:
- providing a user input method for adding at least one additional recipient-specific element not included in the original list of recipient-specific pseudo-predefined elements, wherein semantic allocation of said at least one additional recipient-specific element is configured to occur during the semantic allocation of the recipient-specific pseudo-predefined elements.

17. The computer program product according to claim 14, wherein the user interface provided by said computer program product is further configured for:
- providing a method for allowing the user to modify the final version; and
- providing a method for receiving a final acceptance of the generated communication from the user for sending the generated communication.

* * * * *